(12) United States Patent
Herges et al.

(10) Patent No.: US 8,977,467 B2
(45) Date of Patent: Mar. 10, 2015

(54) VEHICLE HAVING A BRAKE DEVICE WHICH TRANSFERS A BRAKING TORQUE FROM REAR WHEELS TO THE FRONT WHEELS, WITH BRAKE SLIP CONTROL

(75) Inventors: Michael Herges, Munich (DE); Andreas Wimmer, Moosburg (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 12 days.

(21) Appl. No.: 13/510,588

(22) PCT Filed: Nov. 16, 2010

(86) PCT No.: PCT/EP2010/067542
§ 371 (c)(1),
(2), (4) Date: Jul. 17, 2012

(87) PCT Pub. No.: WO2011/061170
PCT Pub. Date: May 26, 2011

(65) Prior Publication Data
US 2012/0277966 A1    Nov. 1, 2012

(30) Foreign Application Priority Data
Nov. 18, 2009 (DE) .......................... 10 2009 053 817

(51) Int. Cl.
*B60T 8/175* (2006.01)
*B60T 8/172* (2006.01)
*B60T 8/1769* (2006.01)

(52) U.S. Cl.
CPC .............. *B60T 8/172* (2013.01); *B60T 8/175* (2013.01); *B60T 8/1769* (2013.01); *B60T 2201/14* (2013.01); *B60T 2250/04* (2013.01); *B60T 2270/12* (2013.01)
USPC ................... 701/74; 701/50; 701/70; 701/71; 701/78; 701/79

(58) Field of Classification Search
None
See application file for complete search history.

(56) References Cited

U.S. PATENT DOCUMENTS 4,991,679 A * 2/1991 Fujii et al. ...................... 180/233
5,012,884 A * 5/1991 Sato ............................... 180/244
(Continued)

FOREIGN PATENT DOCUMENTS

| DE | 196 07 322 | 8/1996 |
|---|---|---|
| DE | 198 46 667 | 4/2000 |
| DE | 10 2007 050063 | 4/2009 |

OTHER PUBLICATIONS

European Patent Office, International Preliminary Report on Patentability, May 22, 2012, from International Patent Application No. PCT/EP2010/067542, filed on Nov. 16, 2010.
(Continued)

*Primary Examiner* — Redhwan Mawari
*Assistant Examiner* — Edward Torchinsky
(74) *Attorney, Agent, or Firm* — Kenyon & Kenyon LLP

(57) ABSTRACT

A control unit for brake-slip-controlled operation of the brake device in a state in which braking torque is transferred from the rear to the front wheels by the coupling arrangement, at least one rotational speed sensor in a drive train of the vehicle for inputting into the control unit rotational speed signals representing the rotational behavior of the coupled front wheels and rear wheels, at least one acceleration sensor for inputting into the control unit acceleration signals representing the vehicle longitudinal acceleration, and/or a vehicle GPS device for inputting into the control unit position signals representing positions of the vehicle, the control unit determining at least one first variable, which is characteristic of a vehicle reference speed and/or a vehicle reference acceleration, based on the acceleration and/or position signals, and so as to determine a second variable, which is characteristic of the rotational behavior of the coupled front and rear wheels, based on the rotational speed signals, and to calculate the brake slip of the coupled front and rear wheels based on the first and second variables.

20 Claims, 1 Drawing Sheet

(56) References Cited

U.S. PATENT DOCUMENTS

| | | | |
|---|---|---|---|
| 5,248,020 A | | 9/1993 | Kreitzberg |
| 5,251,137 A | * | 10/1993 | Chin et al. .................... 701/72 |
| 5,551,526 A | * | 9/1996 | Young et al. .................. 180/233 |
| 5,797,664 A | * | 8/1998 | Tagawa ........................ 303/190 |
| 5,855,532 A | * | 1/1999 | Sugiyama ....................... 477/97 |
| 6,029,111 A | * | 2/2000 | Croyle ......................... 701/494 |
| 8,352,120 B2 | * | 1/2013 | Craig et al. ................... 701/36 |
| 8,459,394 B2 | * | 6/2013 | Storer et al. .................. 180/237 |

OTHER PUBLICATIONS

European Patent Office, English Translation of International Preliminary Report on Patentability and Written Opinion, Jun. 12, 2012, from International Patent Application No. PCT/EP2010/067542, filed on Nov. 16, 2010.

International Search Report of PCT/EP2010/067542 dated Nov. 16, 2010.

* cited by examiner

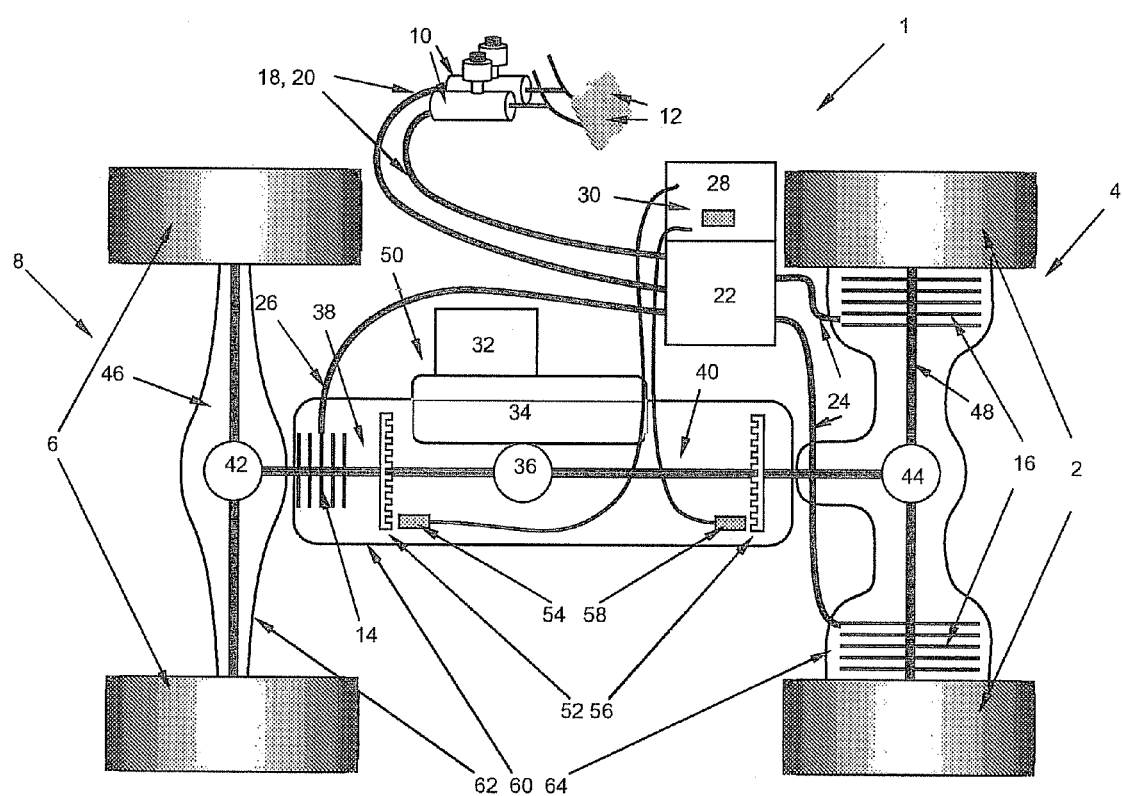

VEHICLE HAVING A BRAKE DEVICE WHICH TRANSFERS A BRAKING TORQUE FROM REAR WHEELS TO THE FRONT WHEELS, WITH BRAKE SLIP CONTROL

FIELD OF THE INVENTION

The present invention relates to a vehicle having a brake device, in which, during braking, the front wheels of a front axle and the rear wheels of at least one rear axle are rigidly coupled to one another, and braking torque is transferred between the rear wheels and the front wheels, by a coupling arrangement brought into a coupling position.

BACKGROUND INFORMATION

On vehicles of the kind used as tractors, in agriculture for example, or as construction vehicles, there are either no wheel brakes at all at the front axle, or these brakes are of such small dimensions that the maximum braking torque supplied thereby is not sufficient. Accordingly, the front wheels are braked entirely or primarily through the coupling to the rear wheels, which are braked by the wheel brakes. Here, the coupling between the front wheels and the rear wheels is generally accomplished by a clutch, which is closed optionally by hand or is closed automatically only during braking, coupling the rear axle driven by the power unit to a propeller shaft, which then transmits driving power or braking power to the wheels of the front axle.

German patent document DE 602 16 661 T2 discusses agricultural utility vehicles having a relatively sophisticated brake-slip-controlled brake device, said vehicles having front wheels provided with wheel brakes in addition to rear wheels provided with wheel brakes. In this document, 4S/4M configurations and 4S/3M configurations are described, in which the wheels of the front axle and the wheels of the rear axle are each provided with a wheel speed sensor, the rear axle is provided with a 2-channel brake modulator and the front axle is provided with a 2-channel or 1-channel brake modulator. The reference speed of the vehicle required for brake slip control is determined by the signals of wheel speed sensors associated with the front wheels and the rear wheels, in particular by averaging the wheel speed signals.

However, such configurations of slip-controlled brake devices are not suitable for vehicles of the type in question, such as agricultural utility vehicles (tractors or farm tractors) or construction vehicles, which have wheel brakes only at the rear axle or rear axles but not at the front axle or have brakes of only small dimensions at the front axle. However, since even such vehicles are nowadays reaching ever higher speeds, high stability and minimum braking distances when braking are a worthwhile aim. For this reason, slip-controlled braking in the context of ABS (antilock system) is desirable on such vehicles. In the case of known ABS systems, however, it is necessary to determine or estimate the vehicle reference speed in order to calculate the brake slip at the individual wheels.

However, if the front wheels are coupled to the rear wheels during braking on the above types of vehicle, there is the problem that all the vehicle wheels rotate at substantially the same wheel speed and may lock up, but the vehicle is still in motion. For this reason, the signals of the wheel speed sensors cannot supply any information on the vehicle reference speed.

SUMMARY OF THE INVENTION

It is therefore an object of the exemplary embodiments and/or exemplary methods of the present invention to further provide a vehicle having a brake device of the type described at the outset so as to achieve an ABS function in a simple manner as part of the brake device.

According to the exemplary embodiments and/or exemplary methods of the present invention, this object is achieved by the features described herein.

The exemplary embodiments and/or exemplary methods of the present invention are characterized by:

a) a control unit for brake-slip-controlled operation of the brake device in a state in which braking torque is transferred from the rear wheels to the front wheels by the coupling arrangement brought optionally or automatically into a coupling position, b) at least one rotational speed sensor in a drive train of the vehicle for inputting into the control unit rotational speed signals representing the rotational behavior of the coupled front wheels and rear wheels, c) at least one acceleration sensor for inputting into the control unit acceleration signals representing the vehicle longitudinal acceleration, and/or a vehicle GPS device for inputting into the control unit position signals representing positions of the vehicle, wherein d) the control unit is configured so as to determine at least one first variable, which is characteristic of a vehicle reference speed and/or a vehicle reference acceleration, on the basis of the acceleration signals and/or the position signals, and so as to determine a second variable, which is characteristic of the rotational behavior of the coupled front wheels and rear wheels, on the basis of the rotational speed signals, and to calculate the brake slip of the coupled front wheels and rear wheels on the basis of the first variable and the second variable.

In other words, the value for the vehicle reference speed and/or for the vehicle reference acceleration or for the vehicle reference deceleration, which is required for determining the wheel slip during braking, is calculated from signals of an acceleration sensor and/or of a vehicle GPS (Global Positioning System) device.

By integrating the vehicle longitudinal acceleration measured by the acceleration sensor over a period of time, for example, it is possible to calculate the vehicle longitudinal speed in this period of time as a vehicle reference speed. As an alternative or in addition, it is likewise possible to calculate the vehicle reference speed from the data supplied by the vehicle GPS (Global Positioning System) device, such as the positions reached by the vehicle, the distance traveled between these positions and the time required to do so.

If the vehicle reference acceleration is additionally required as an ABS input variable, the acceleration sensor supplies such a value directly without conversion. In the case where the data from the vehicle GPS (Global Positioning System) device are evaluated, differentiation of the speed of the vehicle, obtained as described above, with respect to time, is necessary in addition.

On the other hand, the information on the current wheel rotation behavior of the front and rear wheels, which are coupled at least for braking, is obtained with the aid of at least one rotational speed sensor, which can be arranged within the drive train on any drive train component that rotates during braking. Among such components are the wheels, shafts which transfer the braking torque from the rear wheels or rear wheel brakes to the front wheels, in particular propeller and cardan shafts, the power unit or transmission, in particular the differential and clutches. In contrast to the prior art, in which a dedicated wheel speed sensor is required for each wheel that is subject to separate brake slip control, a single rotational speed sensor at any point in the drive train is sufficient here, the signals of said sensor being used to determine the rotational behavior of the coupled wheels while allowing for the known transmission ratios within the drive train. Moreover, the rotational speed sensor need not be arranged close to a wheel either, but can be arranged in a protected location, e.g. in a transmission.

These measures provide even vehicles without wheel brakes or with wheel brakes of small dimensions at the front axle with an ABS brake device or a brake slip control system. In particular, the invention has the advantage that, when the front wheels are coupled to the rear wheels, the front wheels too are braked with brake slip control and, as a result, higher stability at the front axle and shorter braking distances are achieved when braking as compared with the prior art.

The vehicle concerned is, in particular, a vehicle with all wheel drive, such as a construction site utility vehicle or a farm tractor.

Advantageous developments and improvements of the exemplary embodiments and/or exemplary methods of the present invention specified herein are also described in the further descriptions herein.

The brake device may be a brake device actuated by a pressurized fluid, in particular an electric, hydraulic, electrohydraulic, pneumatic, pneumatic-hydraulic, hydropneumatic or electropneumatic brake device.

An electropneumatic brake device refers to a brake device in which a braking value transmitter produces electric signals for electropneumatic pressure regulating modules or modulators, which produce a brake pressure for pneumatic brake cylinders from a pneumatic supply pressure in accordance with said electric signals.

At least two redundant rotational speed sensors are furthermore preferably provided, wherein each rotational speed sensor is associated with a different component of the drive train.

According to a development, a front axle differential, which can be locked and unlocked and which is unlocked by the control unit during braking, is provided at the front axle. The yawing moment acting on the vehicle during braking under μ-split conditions is thereby limited. In particular, the front wheel running on the side with a higher friction coefficient cannot transfer significantly more braking force to the underlying surface than the wheel on the side with a higher friction coefficient.

The coupling arrangement, which can be brought into a coupling position either optionally or automatically, between the rear wheels and the front wheels, may be also provided for the purpose of transferring driving torque between the rear wheels and the front wheels. For example, the coupling arrangement includes a differential, which couples a drive train section of the rear axle and a drive train section of the front axle, which can be locked and unlocked by the control unit and which is switched to a locking position by the control unit at least for braking.

Alternatively or in addition, it is also possible for the coupling arrangement to comprise an all wheel clutch, which is controlled by the control unit, which couples or decouples a drive train section of the rear axle and a drive train section of the front axle to or from one another and which is activated in accordance with the degree of actuation of a braking value transmitter, for example.

The at least one acceleration sensor may be configured to measure the acceleration on a plurality of axes, and the control unit is configured to calculate the vehicle longitudinal acceleration from the acceleration signals associated with the axes. Moreover, at least two redundant acceleration sensors are provided, for example.

According to a development, the at least one acceleration sensor and the control unit are combined to form a module. As an alternative, it is also possible for the acceleration sensor to be arranged separately from the control unit at a suitable location on the vehicle.

In particular, the control unit is configured so as to calculate the instantaneous vehicle reference speed and/or the instantaneous vehicle reference acceleration from a plurality of position signals of the vehicle GPS. In this case, the vehicle GPS device can be integrated into the control unit or forms a separate unit.

The control unit may then be configured so as to
a) check the plausibility and/or calibrate the acceleration signals of the acceleration sensor on the basis of the position signals of the vehicle GPS device, or
b) check the plausibility and/or calibrate the position signals of the vehicle GPS device on the basis of the acceleration signals of the acceleration sensor.

The control unit can furthermore be configured so as to determine the actual brake slip of the coupled front wheels and rear wheels on the basis of the signals relating to the vehicle reference speed and/or the vehicle reference acceleration and of the rotational speed signals and then to adjust the brake slip of the coupled front wheels and rear wheels in accordance with a deviation of the actual brake slip determined from a desired brake slip.

More precise details will emerge from the following description of an illustrative embodiment.

An illustrative embodiment of the invention is shown below in the drawing and explained in greater detail in the following description.

BRIEF DESCRIPTION OF THE DRAWING

The FIGURE shows a schematic circuit diagram of a slip-controlled brake device on a vehicle in accordance with an exemplary embodiment of the invention.

DETAILED DESCRIPTION

The brake device 1 shown schematically in the FIGURE, which is actuated by a pressurized fluid and may be hydraulic, is used for brake-slip-controlled braking of an agricultural utility vehicle, such as a tractor or farm tractor, for example.

Instead of being hydraulic, the brake device 1 can, of course, also be of electrohydraulic, hydropneumatic, electropneumatic or purely pneumatic, purely hydraulic or purely electric configuration, with the restriction that electric or electronic ABS components must also be present in addition to the pneumatic and/or hydraulic components of such a pneumatic, hydraulic or hydropneumatic brake device 1 in order to be able to implement brake slip control.

The hydraulic brake device 1 is of a two-circuit configuration, for example, comprising a front axle brake circuit, associated with a front axle 8 having front wheels 6, and a rear axle brake circuit associated with a rear axle 4 having rear wheels 2. A two-circuit hydraulic brake cylinder 10 is also present, and each brake circuit (front axle, rear axle) can be actuated by a respective brake pedal 12, for example.

The brake device 1 is brake-slip-controlled and therefore includes an antilock system (ABS), which adjusts the brake slip at front axle and rear axle wheel brakes 14, 16 to an optimum brake slip. Hydraulic brake lines 18, 20 therefore extend from the two-circuit brake cylinder 10 to an ABS hydraulic unit 22 and from the latter, in turn, there extend hydraulic brake lines 24, 26 to the respective brake actuators 14, 16 of the front axle 8 and the rear axle 4. The ABS hydraulic unit 22 is electrically controlled by an electronic ABS control unit 28. The ABS control unit 28 is preferably integrated into a module with an acceleration sensor 30 for measuring at least the longitudinal acceleration of the vehicle. Instead of just one rear axle 4, it is also possible for there to be a plurality of, e.g. two, rear axles.

The utility vehicle has a power unit 32, in the form of an internal combustion engine for example. In the present case, the front and rear wheels 6, 2 are driven by the power unit 32 via a transmission 34, a center differential 36 with a longitudinal lock and respective propeller shafts 38, 40 plus an axle differential 42, 44 with a transverse lock at each axle 4, 8. Via drive shafts 46 of the front axle 8 and drive shafts 48 of the rear axle 4, the driving power fed into the propeller shafts 38, 40 is transferred from the axle differentials 42, 44 to the front wheels 6 and rear wheels 2 respectively. Said components 32, 34, 36, 38, 40, 42, 44, 46, 48 together form a drive train 50 of the vehicle, wherein the components 38, 42, 46 associated with the front axle 8 and the components 40, 44, 48 associated with the rear axle 4 each form a drive train section.

The rear wheels 2 are each preferably provided with dedicated brake actuators in the form, for example, of hydraulically actuated multi-disk brakes 16, while the front wheels 6 are braked by a multi-disk brake 14 acting on the propeller shaft 38 associated with the front axle 8. However, this front axle multi-disk brake 14 can only supply a fraction of the braking torque which the multi-disk brakes 16 on the rear axle 4 can supply.

The center differential 36 and the axle differentials 42, 44 as compensating transmissions are preferably controlled electrically by the ABS control unit 28 or by some other control unit and can be switched to a locked and an unlocked position by said unit. As is known, in the locked position, the respectively connected shafts 38, 40, 46, 48 are rigidly connected, while the unlocked position allows these shafts 38, 40, 46, 48 to rotate at different speeds.

The rear wheels 2 can therefore be coupled to the front wheels 6 by the locked center differential 36 and by the locked axle differentials 42, 44 to transfer driving and braking power.

It is also possible, for example, for the coupling and decoupling of the front axle propeller shaft 38 and of the rear axle propeller shaft 40 to be accomplished by a hydraulic all-wheel clutch, which is activated by a solenoid valve in accordance with the actuation of the brake pedals 12, for example, in order to control a flow of pressure medium to and from the hydraulic all-wheel clutch.

Moreover, a pole wheel 52 of a rotational speed sensor 54 is arranged for corotation on the propeller shaft 38 associated with the front axle 8, and a pole wheel 56 of another rotational speed sensor 58 is arranged for corotation on the propeller shaft 40 associated with the rear axle 4.

The transmission 34, the center differential 36, the two propeller shafts 38, 40, the two rotational speed sensors 54, 58, including the pole wheels 52, 56, and the brake actuator 14 associated with the front axle 8 are preferably accommodated in a common central housing 60, to which the power unit 32 is flanged.

Moreover, the axle differentials 42, 44 associated with the front axle 8 and the rear axle 4, respectively, and the associated drive shafts 46, 48 are each housed in a separate axle housing 62, 64.

The center differential 36, which couples and decouples the propeller shaft 38 of the front axle 8 and the propeller shaft 40 of the rear axle 4, is preferably activated in such a way by the ABS control unit 28 that, in the case of braking, it is automatically switched to the locked position, with the result that the front wheels 6 and the rear wheels 2 are rigidly connected and synchronized running of the wheels is produced, i.e. the front wheels 6 and the rear wheels 2 then rotate at the same wheel speed during deceleration. In other words, the front wheels 6 are then coupled to the rear wheels 2 during braking. What is referred to as "all wheel braking" is thereby achieved at all the wheels 2, 6 of the vehicle.

Since the braking torque supplied by the brake actuator 14 of the front axle 8 is relatively low, the front wheels 6 can be braked together with the rear wheels 2 by the center differential 36, which is switched to the locked position, and, during this process, braking torque can be transferred from the brake actuators 16 of the rear axle 4, via the drive shafts 48, axle differential 44, propeller shaft 40, the center differential 36, propeller shaft 38, axle differential 42 and the drive shafts 48 to the front wheels 6.

By virtue of the coupling via the locked drive or braking train 50, i.e. by virtue of the center differential 36 switched into the locking position, braking of the rear wheels 2 then has the effect that braking forces stemming from the braking torque supplied at the rear axle 4 are produced at the front wheels 6 too, and these forces are then added to the braking forces produced by the front axle brake 14.

The brake pressure in the brake actuators 14, 16 is subjected to open-loop or closed-loop control by the ABS or brake slip control routines integrated into the ABS control unit 28 in a number of cycles, each of which comprises a pressure reduction phase, a pressure holding phase and a pressure increase phase.

The two rotational speed sensors 54, 58, which in this case are redundant and diverse, i.e. are arranged on different components 38, 40, are used to input into the ABS control unit 28 rotational speed signals representing the rotational behavior of the two propeller shafts 38, 40 (front axle and rear axle), while the acceleration sensor 30 is used to input into the ABS control unit 28 acceleration signals representing the vehicle longitudinal acceleration. As an alternative, it would also be possible to provide a vehicle GPS (Global Positioning System) device, not shown here, for inputting into the ABS control unit 28 position signals representing positions of the vehicle.

The value for the vehicle reference speed and/or for the vehicle reference acceleration and for the vehicle reference deceleration which is required for determining the wheel slip during braking is then calculated by the ABS control unit 28 from the signals of the acceleration sensor 30 and/or the vehicle GPS device. In particular, mathematical integration of the vehicle longitudinal acceleration measured by the acceleration sensor 30 over a period of time is used to calculate the vehicle longitudinal speed in this period of time as a vehicle reference speed. As an alternative or in addition, it is likewise possible to calculate the vehicle reference speed from the data supplied by the vehicle GPS device, such as the positions reached by the vehicle, the distance traveled between these positions and the time required to do so.

On the other hand, the information on the current wheel rotation behavior of the front and rear wheels 6, 2, which are coupled at least for braking, is obtained with the aid of the rotational speed sensors 54, 58. By the signals of the rotational speed sensors 54, 58 and a comparison with the previously determined vehicle reference speed, the ABS control unit 28 then determines whether the rear wheels and/or the front wheels 2, 6 are in a state of impermissible brake slip and counteracts this by triggering the cycles described above.

In this way, even a vehicle with front wheels 6 and rear wheels 2 which are coupled to one another in the case of braking in order to transfer braking torque can be operated with a closed-loop ABS control system.

The list of reference items is as follows:
1 brake device
2 rear wheels
4 rear axle
6 front wheels
8 front axle
10 brake cylinder
12 brake pedal
14 front axle brake
16 rear axle brake
18 brake line
20 brake line
22 ABS hydraulic unit
24 brake line
26 brake line
28 ABS control unit
30 acceleration sensor
32 power unit
34 transmission
36 differential
38 propeller shaft
40 propeller shaft
42 axle differential
44 axle differential
46 drive shafts
48 drive shafts
50 drive train
52 pole wheel
54 rotational speed sensor
56 pole wheel
58 rotational speed sensor
60 housing
62 axle housing
64 axle housing

The invention claimed is:

1. A vehicle, comprising:
a brake device, in which, during braking, front wheels of a front axle and rear wheels of at least one rear axle are rigidly coupled to one another, and braking torque is transferred between the rear wheels and the front wheels, by a coupling arrangement brought into a coupling position, including:
a control unit for brake-slip-controlled operation of the brake device in a state in which the coupling arrangement is brought into a coupling position;
at least one rotational speed sensor in a drive train of the vehicle for inputting into the control unit rotational speed signals representing the rotational behavior of the coupled front wheels and rear wheels; and
at least one acceleration sensor for inputting into the control unit acceleration signals representing the vehicle longitudinal acceleration, and a vehicle GPS device for inputting into the control unit position signals representing positions of the vehicle;
wherein the control unit is configured so as to determine at least one first variable, which is characteristic of a vehicle reference speed and/or a vehicle reference acceleration, based on at least one of the acceleration signals and the position signals, and so as to determine a second variable, which is characteristic of the rotational behavior of the coupled front wheels and rear wheels, based on the rotational speed signals, and to calculate the brake slip of the coupled front wheels and rear wheels based on the first variable and the second variable,
wherein the front wheels are braked entirely or primarily through the coupling to the rear wheels, which are braked by the wheel brakes,
wherein the control unit is configured so as to calculate at least one of the instantaneous vehicle reference speed and the instantaneous vehicle reference acceleration from a plurality of position signals from the vehicle GPS, and
wherein the at least one rotational speed sensor is arranged within the drive train on at least one drive train component that rotates during braking, the at least one drive train component being at least one of at least one shaft which transfers the braking torque from the rear wheels or rear wheel brakes to the front wheels, a power unit, a transmission differential, and a transmission clutch, and
wherein there is no dedicated wheel speed sensor for each of the wheels that is subject to separate brake slip control.

2. The vehicle of claim 1, wherein the brake device is one of an electric, a hydraulic, an electrohydraulic, a pneumatic, a pneumatic-hydraulic, an electropneumatic and a hydropneumatic brake device.

3. The vehicle of claim 1, wherein there are at least two redundant rotational speed sensors, each of the rotational speed sensors being associated with a different component of the drive train.

4. The vehicle of claim 1, wherein there is an axle differential, which can be locked and unlocked and which is unlocked by the control unit during braking, at the front axle.

5. The vehicle of claim 1, wherein the coupling arrangement includes an all wheel clutch, which is controlled by the control unit, which couples or decouples a drive train section of the rear axle and a drive train section of the front axle to or from one another and which is activated in accordance with the degree of actuation of a braking value transmitter.

6. The vehicle of claim 1, wherein the at least one acceleration sensor is configured to measure the acceleration on a plurality of axes, and the control unit is configured to calculate the vehicle longitudinal acceleration from the acceleration signals associated with the axes.

7. The vehicle of claim 1, wherein there are at least two redundant acceleration sensors.

8. The vehicle of claim 1, wherein the at least one acceleration sensor and the control unit are combined to form a module.

9. The vehicle of claim 1, wherein the vehicle GPS device is integrated into the control unit or forms a separate unit.

10. The vehicle of claim 1, wherein the control unit is configured so as to one of: (i) check the plausibility and/or calibrate the acceleration signals of the acceleration sensor on the basis of the position signals of the vehicle GPS device, and (ii) check the plausibility and/or calibrate the position signals of the vehicle GPS device based on the acceleration signals of the acceleration sensor.

11. The vehicle of claim 1, wherein the control unit is configured so as to determine the actual brake slip of the coupled front wheels and rear wheels based on the signals relating to the vehicle reference speed and/or the vehicle reference acceleration and of the rotational speed signals and then to adjust the brake slip of the coupled front wheels and rear wheels in accordance with a deviation of the actual brake slip determined from a desired brake slip.

12. The vehicle of claim 1, wherein the at least one rotational speed sensor is arranged within the drive train on the at least one drive train component that rotates during braking, the at least one drive train component being the at least one shaft which transfers the braking torque from the rear wheels or rear wheel brakes to the front wheels.

13. The vehicle of claim 1, wherein the coupling arrangement, which can be brought into a coupling position either optionally or automatically, between the rear wheels and the front wheels also provides for transferring driving torque between the rear wheels and the front wheels.

14. The vehicle of claim 13, wherein the coupling arrangement includes a differential, which couples a drive train section of the rear axle and a drive train section of the front axle, which can be locked and unlocked by the control unit and which is locked by the control unit at least for braking.

15. The vehicle of claim 1, wherein there are at least two redundant rotational speed sensors, each of the rotational speed sensors being associated with a different component of the drive train, wherein there is an axle differential, which can be locked and unlocked and which is unlocked by the control unit during braking, at the front axle, wherein the at least one acceleration sensor is configured to measure the acceleration on a plurality of axes, and the control unit is configured to calculate the vehicle longitudinal acceleration from the acceleration signals associated with the axes, and wherein the control unit is configured so as to calculate the instantaneous vehicle reference speed and/or the instantaneous vehicle reference acceleration from a plurality of position signals from the vehicle GPS.

16. The vehicle of claim 15, wherein the coupling arrangement, which can be brought into a coupling position either optionally or automatically, between the rear wheels and the front wheels also provides for transferring driving torque between the rear wheels and the front wheels, and wherein the coupling arrangement includes a differential, which couples a drive train section of the rear axle and a drive train section of the front axle, which can be locked and unlocked by the control unit and which is locked by the control unit at least for braking.

17. The vehicle of claim 15, wherein the coupling arrangement includes an all wheel clutch, which is controlled by the control unit, which couples or decouples a drive train section of the rear axle and a drive train section of the front axle to or from one another and which is activated in accordance with the degree of actuation of a braking value transmitter.

18. The vehicle of claim 15, wherein there are at least two redundant acceleration sensors, and wherein the at least one acceleration sensor and the control unit are combined to form a module, and wherein the vehicle GPS device is integrated into the control unit or forms a separate unit.

19. The vehicle of claim 15, wherein the control unit is configured so as to one of: (i) check the plausibility and/or calibrate the acceleration signals of the acceleration sensor on the basis of the position signals of the vehicle GPS device, and (ii) check the plausibility and/or calibrate the position signals of the vehicle GPS device based on the acceleration signals of the acceleration sensor.

20. The vehicle of claim 15, wherein the control unit is configured so as to determine the actual brake slip of the coupled front wheels and rear wheels based on the signals relating to the vehicle reference speed and/or the vehicle reference acceleration and of the rotational speed signals and then to adjust the brake slip of the coupled front wheels and rear wheels in accordance with a deviation of the actual brake slip determined from a desired brake slip.

* * * * *